United States Patent [19]
de Bentzmann

[11] Patent Number: 4,518,841
[45] Date of Patent: May 21, 1985

[54] DEVICE FOR PRODUCING REINFORCEMENTS FOR USE IN REINFORCED CONCRETE

[76] Inventor: Bertrand L. de Bentzmann, Bragueze, Roumagne, France

[21] Appl. No.: 504,145

[22] Filed: Jun. 14, 1983

[30] Foreign Application Priority Data

Jun. 23, 1982 [FR] France ............... 82 11001

[51] Int. Cl.³ ..................... B23K 11/32
[52] U.S. Cl. ............. 219/56; 219/78.16
[58] Field of Search .......... 219/56, 58, 78.16

[56] References Cited
U.S. PATENT DOCUMENTS 1,323,621 12/1919 Edwards ............... 219/56
3,370,150 2/1968 Nordgren ............... 219/56
3,706,331 12/1972 Pennington ............ 219/56

Primary Examiner—Roy N. Envall, Jr.
Assistant Examiner—Alfred S. Keve
Attorney, Agent, or Firm—Dennison, Meserole, Pollack & Scheiner

[57] ABSTRACT

Multiple movable support members positioned to shape transverse elements about multiple longitudinal elements, each support member supporting an electrical welding member and a shaping member which, upon movement of the support member, simultaneously shapes a transverse element about a longitudinal element and welds the transverse element to the longitudinal element.

6 Claims, 7 Drawing Figures

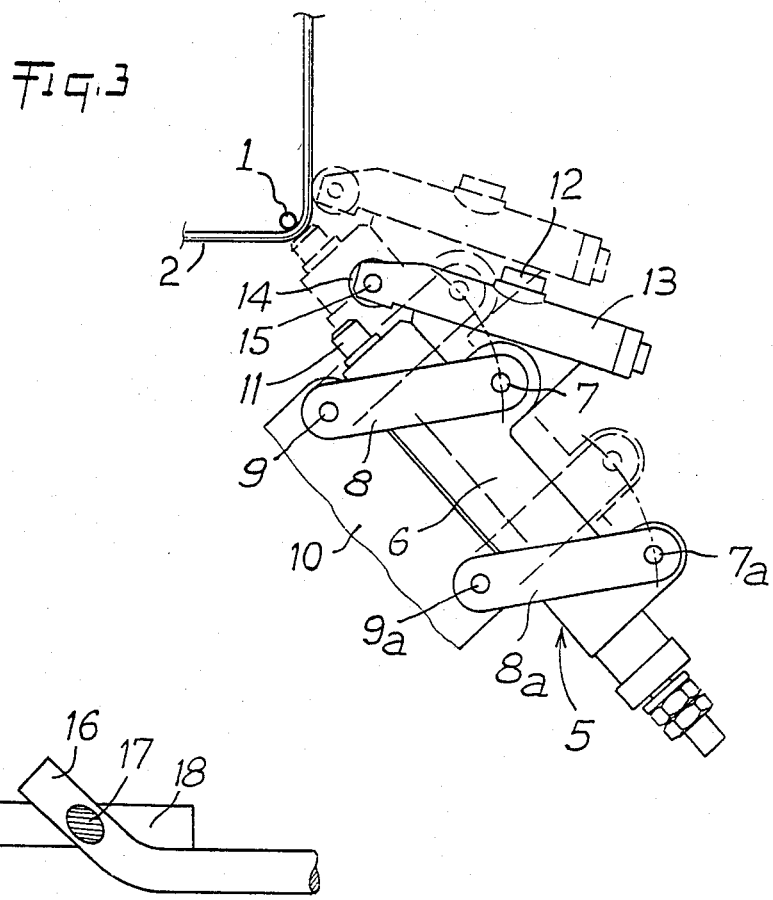
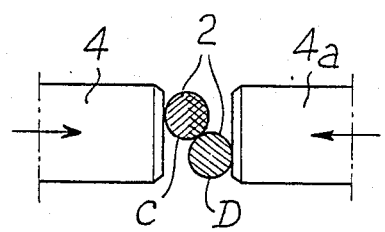
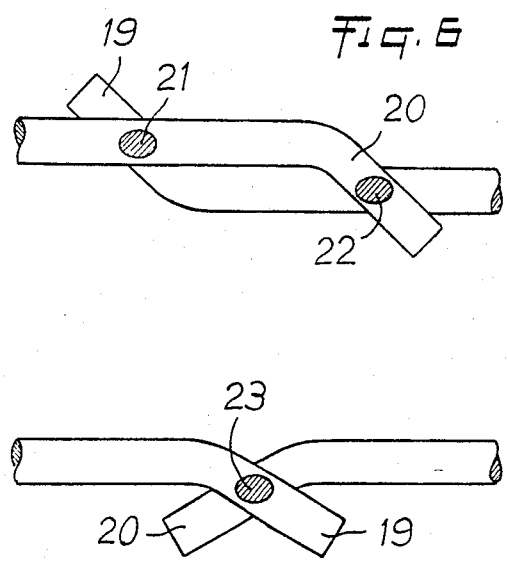

DEVICE FOR PRODUCING REINFORCEMENTS FOR USE IN REINFORCED CONCRETE

The present invention relates to a device for producing reinforcements for use in reinforced concrete and constituted of longitudinal elements joined by transverse wire elements.

At the moment, these reinforcements are manufactured either by hand, or mechanically by assembling transverse elements or frames produced beforehand from longitudinal elements.

Another method consists in producing a flat article such as a grid, the longitudinal elements of which constitute the web which is thereafter folded about said elements.

According to the present invention, the device comprises, for each one of the longitudinal elements on which is secured the transverse element, a movable member supporting electrical welding means using an electrical element, and shaping means which, in the same movement, simultaneously shapes the transverse element and welds it to the longitudinal element.

With the method according to the present invention, it is possible to simplify the shaping and assembling device and to increase production rate.

The invention will be more readily understood on reading the following description with reference to the accompanying drawings, in which:

FIG. 3 is an elevational view of a shaping and welding head;

FIG. 4 is a detailed view showing the welding of the ends of a transverse element or frame;

FIGS. 5, 6 and 7 are views illustrating various configurations for the overlapped and welded ends of the transverse elements.

Figure 1:
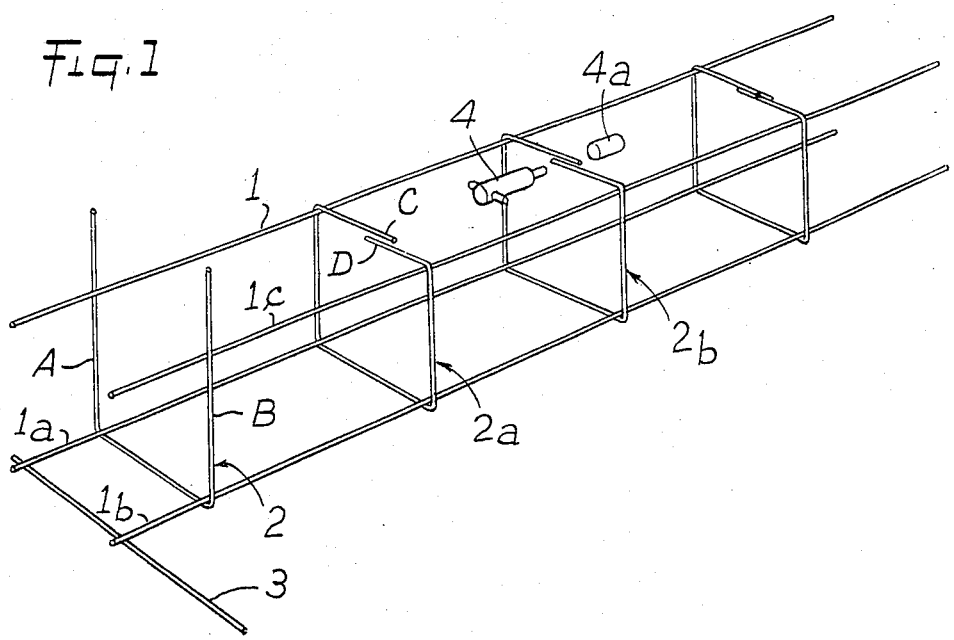
FIG. 1 is a perspective view of a reinforcement for concrete showing the different stages of production of the transverse elements or frames.

In constructing the reinforcements of the invention, longitudinal elements are joined by transverse elements or frames made of wire and which are shaped and welded to the longitudinal elements. To produce such a reinforcement, the longitudinal elements remain fixed, and the shaping and welding means used are mounted so as to move along a supporting beam.

During a first operation, a wire element 3 is placed under the lower longitudinal elements 1a, 1b (FIG. 1), in such a way that, during a second operation, the transverse element 2 has its two branches A and B folded vertically around the lower elements 1a, 1b and being brought into contact with the upper longitudinal elements 1, 1c. Simultaneously, the transverse element 2 is welded to the lower longitudinal elements 1a, 1b. During a third operation (FIG. 1), the branches A and B of the transverse element 2 are folded horizontally over the upper longitudinal elements 1, 1c, and welded to the said longitudinal elements so that the ends C and D are placed in facing relation and so that the transverse element adopts the shape shown in 2a. During a fourth operation, the ends C and D of the transverse element 2b are placed between two electrodes 4, 4a used for welding said transverse element with a view to forming a frame.

Figure 2:
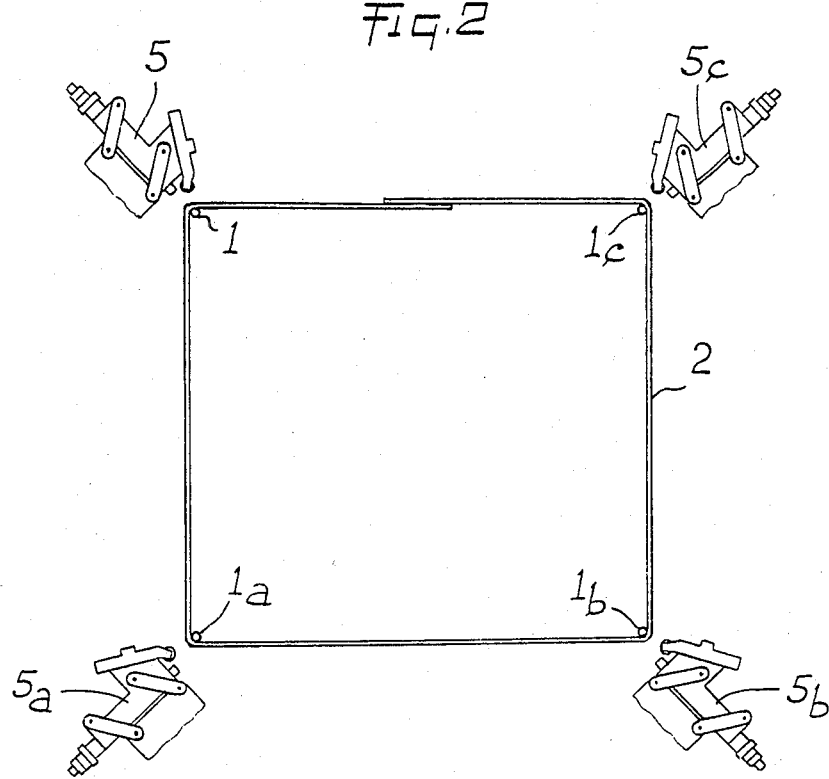
FIG. 2 is a cross-sectional view of a reinforcement and of the reinforcement-producing device according to the invention.

To arrive at that result, shaping and welding heads 5, 5a, 5b, 5c (FIG. 2) are provided at every angle of the reinforcement, opposite the longitudinal elements 1, 1a, 1b, 1c, said heads being mounted on a beam not shown in the drawing, which enables to selectively bring the said heads 5 to 5c opposite the parts of the transverse element 2 which require to be shaped and welded to the longitudinal elements.

One of these heads 5, which is illustrated in more detail in FIG. 3, is constituted by a supporting member 6 provided with two pivot pins 7, 7a, about which parallel levers 8, 8a are pivotally mounted by one of their ends, said levers being pivotally mounted by their other end about pivot pins 9, 9a on a structure 10 integral with a support beam element not shown in the drawing.

The support member 6 is provided at one of its ends with a resistance-welding electrode 11 connected by way of a cable to one of the phases of an electrical supply circuit of which the other phase is connected to one of the longitudinal elements. A bar 13 is fixed on the support member 6 by way of screws 12, the axis of said bar forming an angle with the axis of the electrode 11, and said bar carrying at one of its ends a shaping roller 14 mounted for free rotation of a pin 15 integral with said bar.

This particular design wherein the support member 6 is pivotally mounted on the structure 10 by means of parallel levers 8, 8a enables the said member and the shaping roller 14 and welding member 11 to move along an arcuate path as illustrated by dash-line arcs in FIG. 3.

During this movement, the roller 14 which, at the start, is in contact with the rectilinear part of the wire of the transverse element 2 causes the said wire to fold around the longitudinal element 1 so as to bring the wire of the transverse element in the position shown in solid lines in FIG. 3.

Moreover, the electrode 11, which, at the start, is not contacting, moves with the roller 14 and comes at end-of-course, in contact with the wire of the transverse element 2 thus ensuring welding at the point of contact between the longitudinal element 1 and the transverse element 2. This particular arrangement makes it possible during a movement of the head 5 in the direction of arrow F to simultaneously carry out the shaping of the transverse element 2 and the welding of the transverse element on the longitudinal element 1.

As illustrated in FIGS. 1 and 4, the ends C and D of the transverse element 2 are resistance-welded by means of two electrodes 4, 4a which are brought to rest against the two ends of the transverse element 2.

According to the embodiment shown in FIG. 5, one of the ends of the wire 16 is folded to form a predetermined angle with the axis of the wire and the folded part 16 is welded in 17 on the other straight end of the wire 18.

According to FIG. 6, the two ends 29 and 20 are also folded as in the preceding case and the folded parts are welded in 21 and 22 on the straight part of the other end of the wire.

According to the embodiment shown in FIG. 7, the folded ends 19, 20 of the wire of the transverse element are welded one over the other in a single point 23.

The invention is in no way limited to the description given hereinabove and on the contrary covers any modifications that can be brought thereto without departing from its scope or its spirit.

What I claim is:

1. A device for producing reinforcements for use in reinforced concrete wherein the reinforcement is defined by laterally spaced parallel longitudinal elements joined by transverse wire elements formed about and welded to each of said longitudinal elements; said device comprising means for forming a transverse element about a plurality of spaced parallel longitudinal elements and simultaneously welding the transverse element to each longitudinal element as it is formed thereabout, said means comprising a plurality of support members, one positionable adjacent each longitudinal element, means mounting each support member for extension and retraction, each support member mounting shaping means operable, upon extension of the support member, to engage and shape a transverse element about a longitudinal element, each support member additionally mounting welding means operable, upon extension of the support member, to weld the shaped transverse element to the longitudinal element at the time of the shaping thereof.

2. A device as in claim 1 wherein said plurality of support members are positioned in spaced relation to each other with at least selected ones of said support members being sequentially operable to effect a progressive shaping and welding of a transverse element about a plurality of longitudinal elements.

3. A device as in claim 2 including a stable structure and wherein said means mounting each support member comprises lever means pivotally engaged between the stable structure and each support member for an arcuate extension of the support member with the shaping means and welding means thereon.

4. A device as in claim 3 wherein each said welding means comprises an electrode, and each said shaping means includes a shaping roller positioned forward and laterally of the corresponding electrode, whereby the shaping roller engages a transverse element and remains in engagement therewith during a welding engagement of the electrode.

5. A device as in claim 2 wherein selected ones of said support members are simultaneously operable.

6. A device as in claim 3 wherein said lever means comprises a pair of laterally spaced parallel links, each pivotally engaged at their opposite ends with the support member and the stable structure.

* * * * *